(12) United States Patent
Hága et al.

(10) Patent No.: US 8,838,093 B2
(45) Date of Patent: Sep. 16, 2014

(54) METHOD AND DEVICE FOR MONITORING WIRELESS TERMINAL BEHAVIOR ACCORDING TO TERMINAL TYPE

(71) Applicant: Telefonaktiebolaget L M Ericsson (publ), Stockholm (SE)

(72) Inventors: Péter Hága, Budapest (HU); Zsolt Kenesi, Budapest (HU); László Toka, Budapest (HU); András Veres, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 20 days.

(21) Appl. No.: 13/749,815

(22) Filed: Jan. 25, 2013

(65) Prior Publication Data
US 2013/0294263 A1    Nov. 7, 2013

Related U.S. Application Data

(63) Continuation-in-part of application No. 13/463,882, filed on May 4, 2012, now Pat. No. 8,554,202.

(51) Int. Cl.
*H04W 24/00* (2009.01)
*H04W 24/08* (2009.01)
*H04L 12/26* (2006.01)

(52) U.S. Cl.
CPC .............. *H04W 24/00* (2013.01); *H04W 24/08* (2013.01); *H04L 43/08* (2013.01); *H04L 43/16* (2013.01); *H04L 43/065* (2013.01)

USPC ........ 455/425; 455/423; 455/418; 455/422.1; 455/522

(58) Field of Classification Search
CPC ........ H04W 24/00; H04W 88/02; H04M 1/24
USPC ...................... 455/425, 423, 418, 422.1, 522
See application file for complete search history.

(56) References Cited

U.S. PATENT DOCUMENTS

| | | |
|---|---|---|
| 5,812,636 A | 9/1998 | Tseng et al. |
| 8,260,286 B2 | 9/2012 | Vikstedt et al. |
| 2004/0038678 A1 | 2/2004 | Lescuyer et al. |
| 2007/0189272 A1 | 8/2007 | Hutchinson et al. |
| 2009/0325543 A1 | 12/2009 | Dubois et al. |
| 2011/0282972 A1* | 11/2011 | Rosen ........................... 709/219 |

FOREIGN PATENT DOCUMENTS

| | | |
|---|---|---|
| EP | 1271978 A2 | 1/2003 |
| EP | 2237596 A1 | 10/2010 |

(Continued)

*Primary Examiner* — Nghi H. Ly
(74) *Attorney, Agent, or Firm* — Coats & Bennett, P.L.L.C.

(57) ABSTRACT

One or more embodiments of a method and device taught herein provide for monitoring wireless terminal behavior in a wireless communication network, where each wireless terminal has a defined terminal type. Data describing the behavior of a plurality of wireless terminals in the wireless communication network is obtained. Based on the obtained data, an aggregated severity score for a given terminal type is determined that is indicative of the extent to which one or more of a plurality of performance criteria have not been met by wireless terminals of the given terminal type. If the aggregated severity score for the given terminal type exceeds a corresponding severity score threshold, one or more of a plurality of predefined actions are performed based on the extent to which the threshold is exceeded.

24 Claims, 8 Drawing Sheets

(56) References Cited

FOREIGN PATENT DOCUMENTS

| | | | |
|---|---|---|---|
| EP | 2362691 | A2 | 8/2011 |
| EP | 2393319 | A1 | 12/2011 |
| WO | 9810613 | A1 | 3/1998 |
| WO | 0201899 | A1 | 1/2002 |
| WO | 2005076644 | A1 | 8/2005 |
| WO | 2011026525 | A1 | 3/2011 |
| WO | 2012111387 | A1 | 8/2012 |

* cited by examiner

| M (IMEI / TAC) | Accumulation period #1 | Accumulation period #2 | Accumulation period #3 | . . . | Accumulation period #N |
|---|---|---|---|---|---|
| Event type #1 | | | | | |
| Event type #2 | | | | | |
| Event type #3 | | | | | |
| . . . | | | | | |
| Event type #N | | | | | |

METHOD AND DEVICE FOR MONITORING WIRELESS TERMINAL BEHAVIOR ACCORDING TO TERMINAL TYPE

RELATED APPLICATIONS

This application is a continuation-in-part of U.S. application Ser. No. 13/463,882, filed on May 4, 2012, the disclosure of which is incorporated herein by reference in its entirety.

TECHNICAL FIELD

The present disclosure generally relates to monitoring wireless terminal behavior in a wireless communication network, and more particularly to analyzing wireless terminal behavior according to terminal type.

BACKGROUND

Numerous standards are accepted to ensure smooth interoperability between network equipment of telecommunications vendors and the many mobile wireless terminal types operating in a given wireless communication network (e.g., those from the 3rd Generation Partnership Project or "3GPP"). These standards describe acceptable ways for communication to take place between terminals and network equipment, and are understood as setting forth basic communication ethics. Wireless terminal manufacturers are expected to follow these basic ethics. However, a selfish actor may benefit by increasing costs to other actors. For example, a wireless terminal manufacturer may seek to extend their terminal battery life by having their mobile terminals unnecessarily attach and detach to the network every minute. Thus, wireless terminals acting in selfish ways could provide an incremental benefit to their users, but this in turn could cause network operators to suffer through unnecessary signaling overhead, unnecessary traffic, etc.

While terminals can be tested in lab environments prior to being approved for network usage, providing a priori verification that such selfish behavior will not occur is not always possible, because lab testing requires considerable time and resources, and because the number of wireless terminal types is rapidly increasing and some manufacturers do not provide their terminals for testing prior to deployment. Additionally, prior wireless terminal evaluation methods have been insufficient to simulate the multitude of firmware and/or operating system versions continuously appearing during the lifespan of a terminal type.

SUMMARY

According to one or more embodiments, a method of monitoring wireless terminal behavior in a wireless communication network is disclosed, where each wireless terminal has a defined terminal type. The method is performed by a device operatively connected to, or incorporated within, a network node in the wireless communication network. According to the method, data describing the behavior of a plurality of wireless terminals in the wireless communication network is obtained. Based on the obtained data, an aggregated severity score for a given terminal type is determined that is indicative of the extent to which one or more of a plurality of performance criteria have not been met by wireless terminals of the given terminal type. If the aggregated severity score for the given terminal type exceeds a corresponding severity score threshold, one or more of a plurality of predefined actions are performed based on the extent to which the threshold is exceeded.

In one or more embodiments, the terminal type of each of the plurality of wireless terminals is determined from a Type Allocation Code (TAC) portion of an International Mobile Station Equipment Identity (IMEI) of each wireless terminal.

The aggregated severity score may be calculated in a number of different ways. According to one embodiment it is determined by determining individual severity scores for individual wireless terminals of the given terminal type, and aggregating the individual severity scores for the plurality of wireless terminals according to terminal type to determine the aggregated severity score for the given terminal type. The aggregating of individual severity scores in one embodiment is a sum of all individual severity scores for the terminal type. In another embodiment, a given terminal type has a plurality of aggregated severity scores, each including a sum of individual severity scores for the terminal type for a respective one of the plurality of performance criteria.

In one or more embodiments terminal type matrices are used to store data about the obtained data of their respective terminals. The matrices may be used to store severity scores, or quantities of signaling events occurring within an observation period, for example.

A number of different performance criteria may be used. In one embodiment the performance criteria includes one or more of the following: permissible deviations from typical wireless terminal behavior; a permissible impact of a given wireless terminal on the wireless communication network; permissible boundaries for quantities of signaling events in the wireless communication network; and a permissible quality of service level to be experienced by a given wireless terminal.

According to one embodiment, the plurality of predefined actions include at least one of the following: providing a warning regarding the given terminal type to a network operator of the wireless communication network, to users of wireless terminals of the given terminal type, or both; and preventing the given terminal type from utilizing the wireless communication network.

A corresponding device operative to monitor wireless terminal behavior in a wireless communication network according to one or more of the various embodiments discussed above is also disclosed. The device is operatively connected to, or incorporated within, a network node in the wireless communication network.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
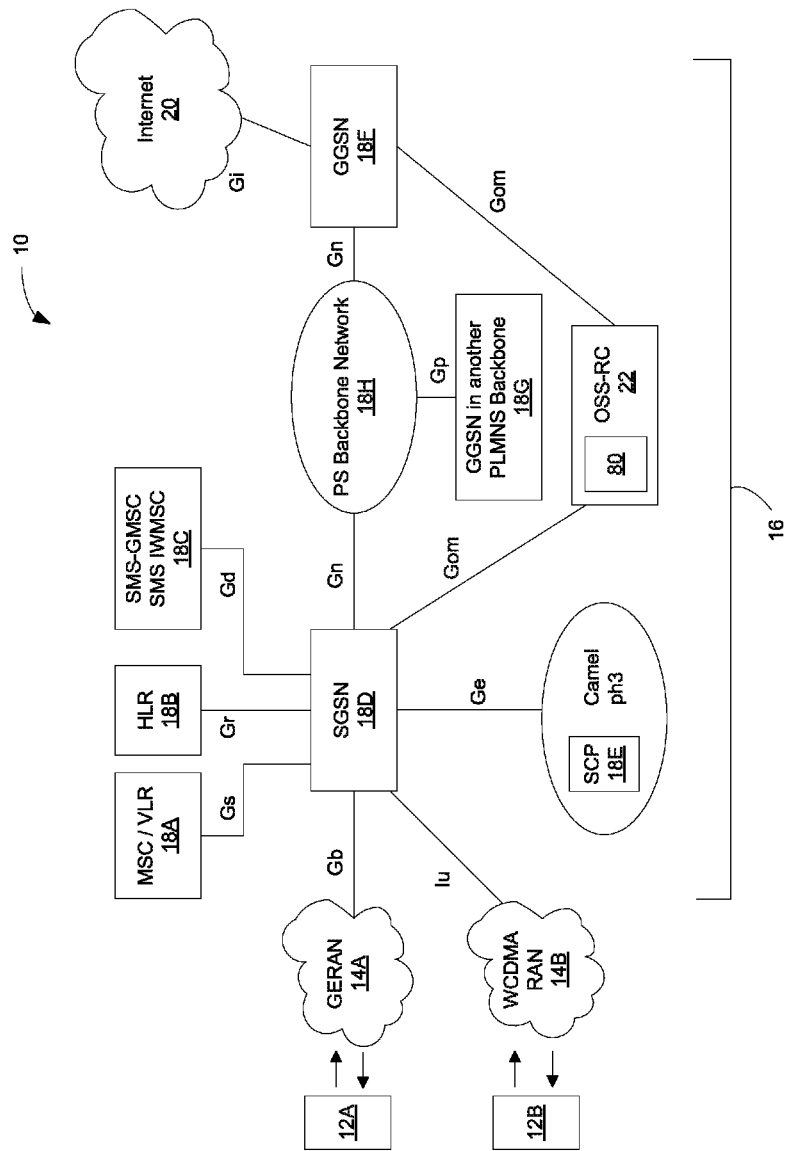
FIG. 1 is a block diagram of an example wireless communication network.

FIG. 1 is a block diagram of an example wireless communication network 10 in which a plurality of wireless terminals 12 communicate through their respective radio access networks (RANs) 14 with a core network 16 portion of the network 10. Although only two wireless terminals 12 are shown, it is understood that the wireless communication network could support many more wireless terminals 12. The wireless terminals may include any of a variety of devices utilizing a wireless communication network, such as mobile phones (e.g., a user equipment or "UE," smartphones, PDAs), tablets, laptops, or even Machine Type Communication (MTC) devices. Each of the wireless terminals 12 has a defined terminal type. In one or more embodiments the terminal type of each of the plurality of wireless terminals is determined from a Type Allocation Code (TAC) portion of an International Mobile Station Equipment Identity (IMEI) of the wireless terminal 12.

The core network 16 includes a plurality of nodes 18A-18H whose respective functions are well known to those of ordinary skill in the art, and are therefore not discussed in detail herein. It is understood that although the nodes 18 are each illustrated as a single node, some of the nodes 18, such as packet-switched backbone network 18H, may actually include a plurality of network nodes. In one or more embodiments the core network 16 connects the network 10 to other wide area networks (WANs), such as the Internet 20, and/or to other public land mobile networks (PLMNs). The wireless network includes a plurality of defined standardized interfaces connecting the various nodes 18 to each other and to the RANs 14. These include, for example, the Gs, Gb, Gr, Gd, Gn, Ge, Iu, Gp and Gi interfaces. The network also includes an Operation Support System for Radio & Core (OSS-RC) node 22 operative to monitor performance data for the plurality of wireless terminals 12.

Figure 2:
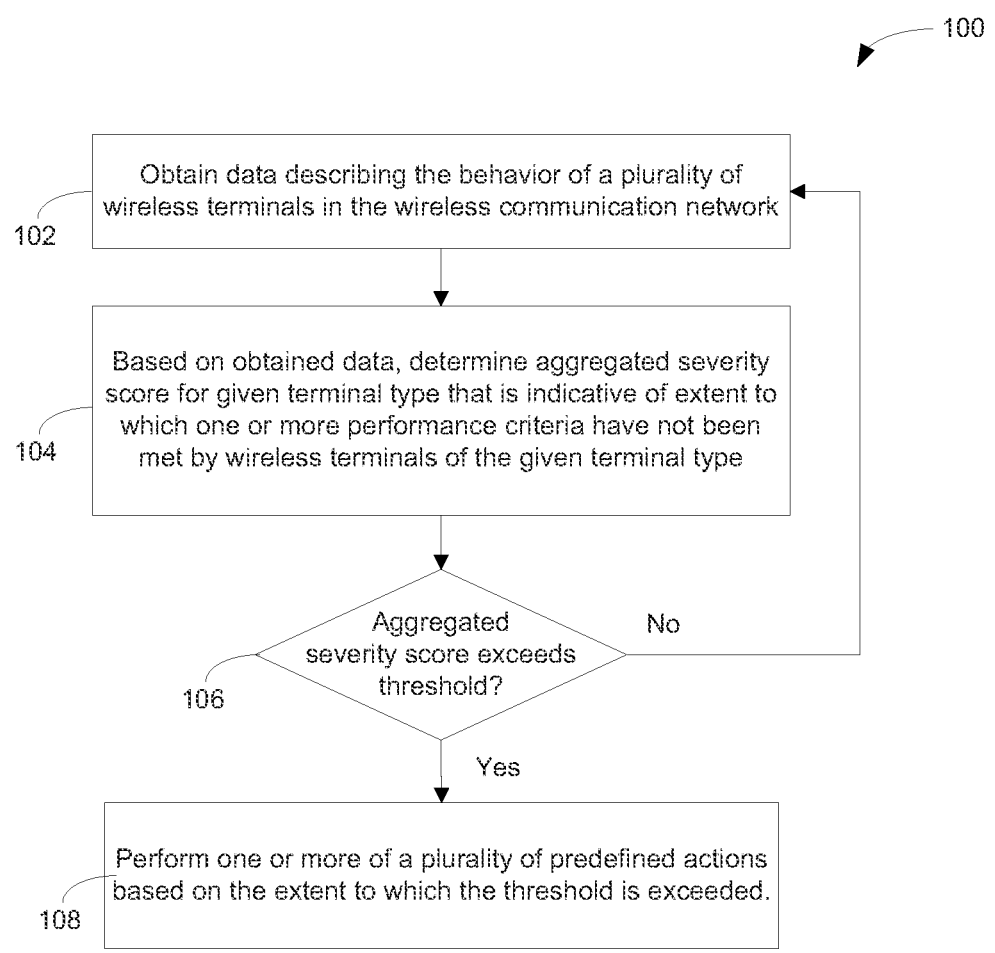
FIG. 2 illustrates an example method of monitoring wireless terminal behavior.

FIG. 2 illustrates an example method 100 of monitoring wireless terminal behavior in a wireless communication network, with each wireless terminal 12 has a defined terminal type. The method 100 is performed by a device 80 operatively connected to, or incorporated within, a network node in the wireless communication network (e.g., OSS-RC node 22). Of course, although the device 80 is illustrated in FIG. 1 as being within node 22, it is understood that this is only an example location. The device 80 obtains data describing the behavior of a plurality of wireless terminals in the wireless communication network ("behavior data") (block 102). Based on the obtained data, the device 80 determines an aggregated severity score for a given terminal type that is indicative of the extent to which one or more of a plurality of performance criteria have not been met by wireless terminals of the given terminal type (block 104). If the aggregated severity score for the given terminal type exceeds a corresponding severity score threshold (a "yes" from block 106), the device 80 performs one or more of a plurality of predefined actions based on the extent to which the threshold is exceeded (block 108). Otherwise, the device 80 proceeds again to block 102.

The method 100 is used to identify terminal types that do not behave as expected by the standards or implemented by a network operator managing the network 10, and is used to decide an action to be performed according to the severity of the identified problem. The identified problems may stem from wireless terminal hardware or software issues, for example. As will be discussed in greater detail below, the method 100 can advantageously be used to protect, or at least partially insulate, the network 10 from malfunctioning terminal types.

Figure 3:
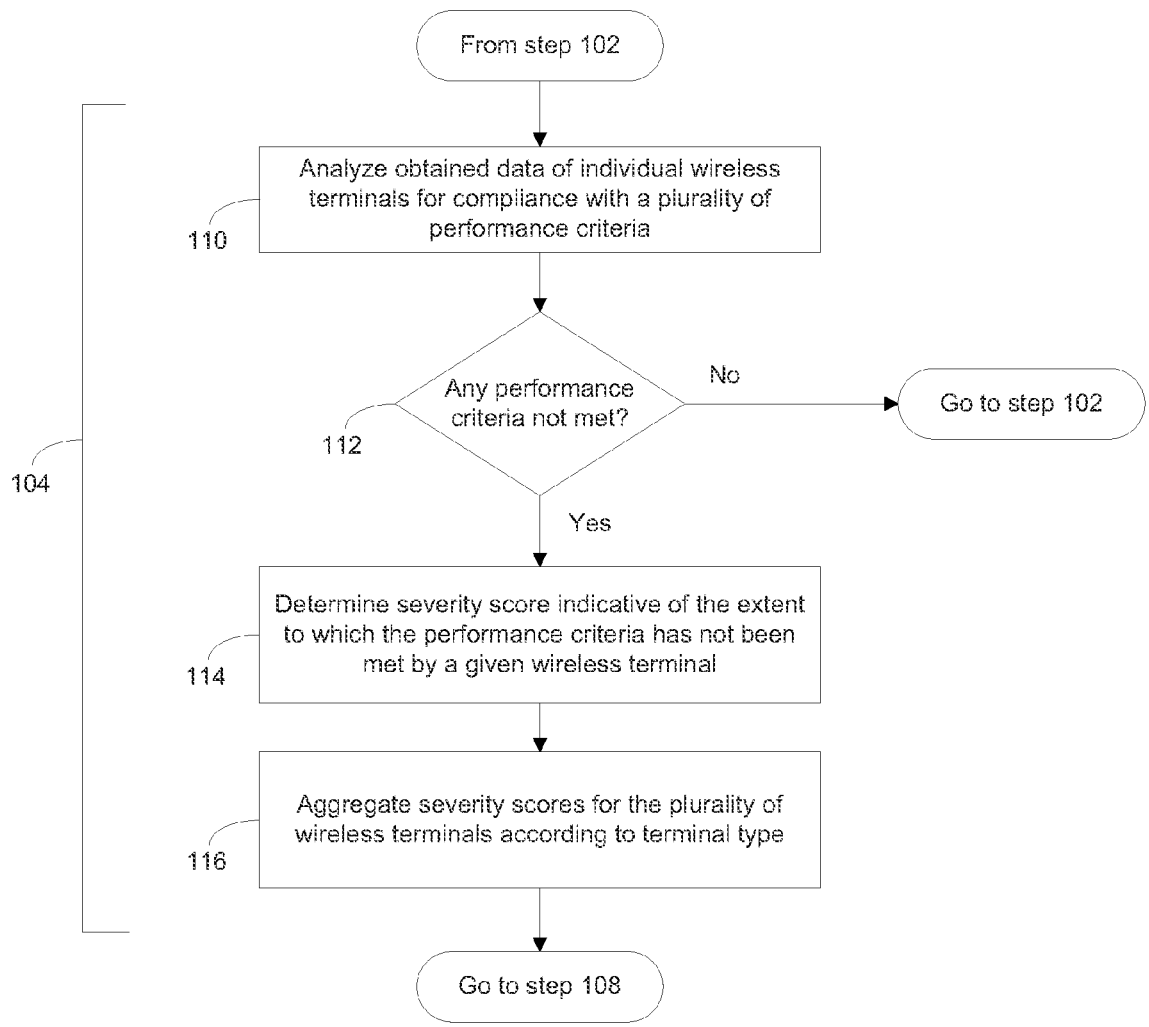
FIG. 3 illustrates an example method for determining an aggregated severity score.

FIG. 3 illustrates an example implementation of block 104 of FIG. 2, for determining an aggregated severity score. In the example of FIG. 3, the behavior data is analyzed for compliance with a plurality of performance criteria (block 110), and a check is performed to determine if any of the performance criteria have not been met (block 112). If all performance criteria are met then the device 80 returns to step 102. However, if any performance criteria is not met for one of the wireless terminals, then the device 80 determines a severity score indicative of the extent to which the performance criteria has not been met by a given wireless terminal (block 114). Individual severity scores for the plurality of wireless terminals are then aggregated according to terminal type (block 116).

Figure 4A:
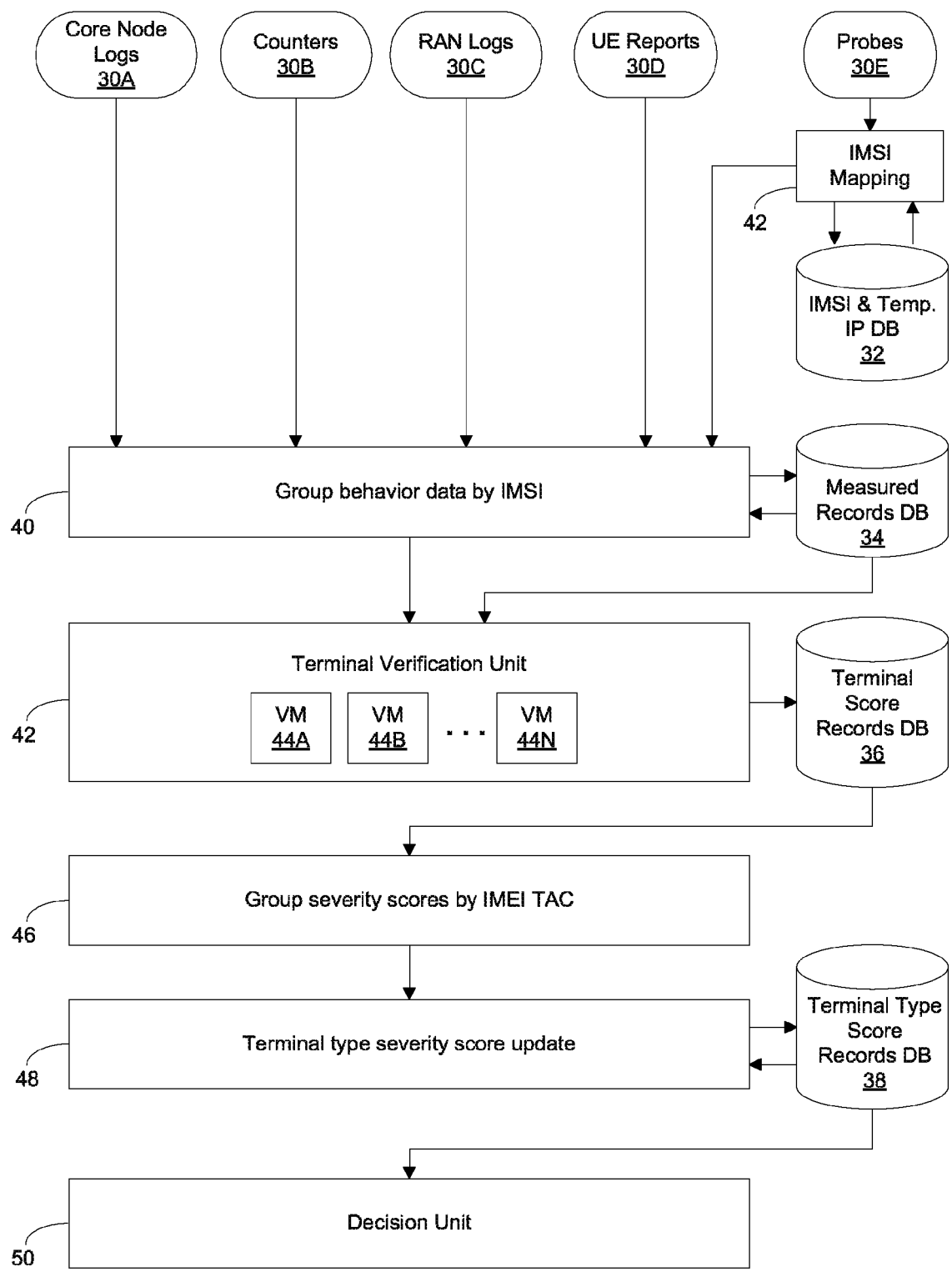
FIG. 4A illustrates the method of FIG. 2 according to one embodiment.
Figure 4B:
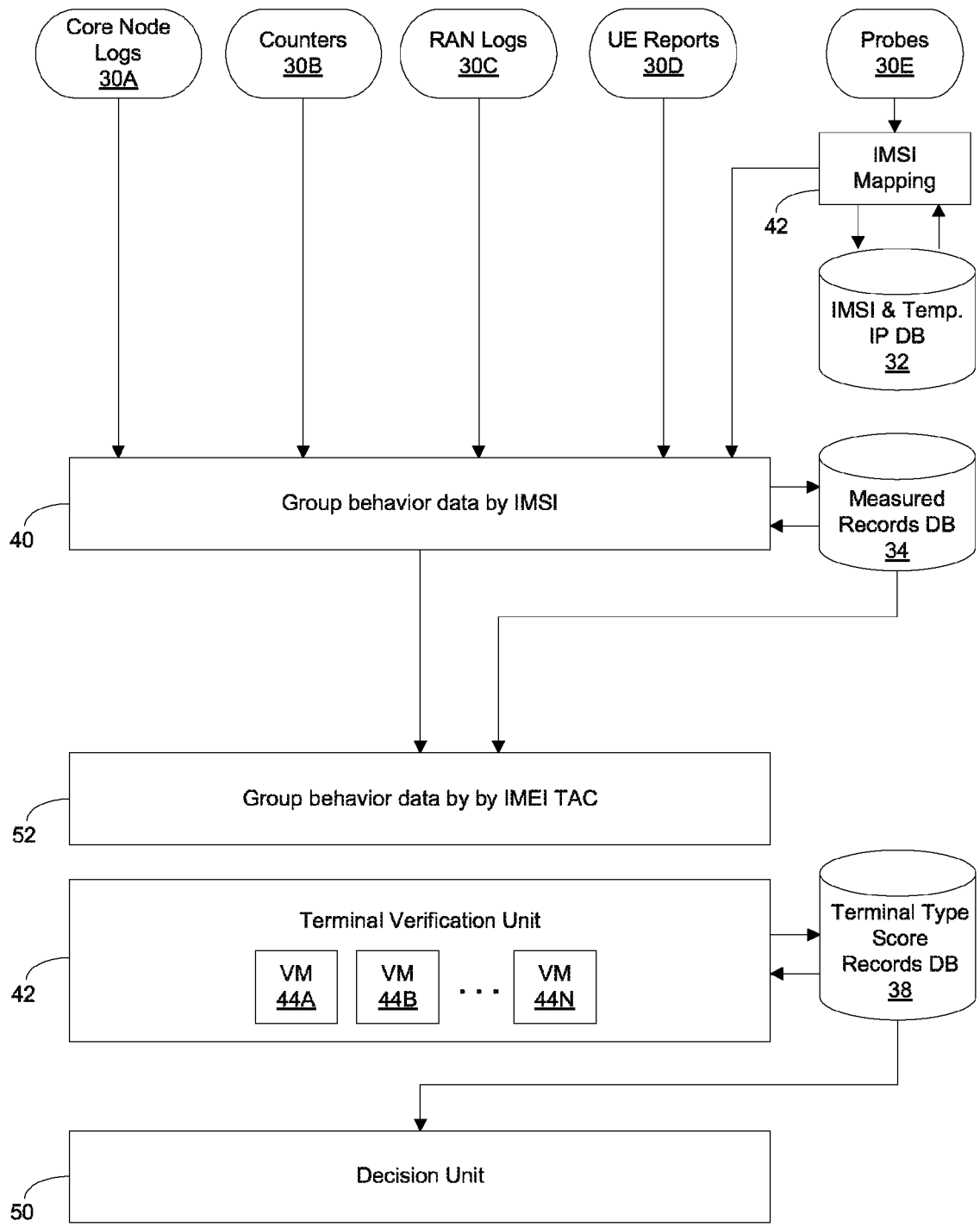
FIG. 4B illustrates the method of FIG. 2 according to another embodiment.

FIGS. 4A-B elaborate on the method 100 according to multiple embodiments. Referring to FIG. 4A, the method of FIG. 2 is illustrated according to an embodiment that is consistent with FIG. 3. Behavior data is obtained from a plurality of data sources 30A-E. The data sources 30 include raw data containing performance related values for active subscribers of the wireless communication network 10. Some example data sources include core node logs 30A, counters 30B, RAN logs 30C, user equipment (UE) reports 30D, and probes 30E. Although only five data sources are shown, it is understood that these are only example data sources, and that other quantities data sources could be used, in addition to or in place of these example data sources.

The core node logs 30A correspond to logs recorded in the core network 16 portion of wireless communication network 10. The counters 30B keep track of commonly used quantities of various network nodes (e.g., number of dropped calls or packets, how often a link is a bottleneck, etc.) and other various pieces of information about a cell of one of the RANs 14. The RAN logs 30C may include event logs detailing signaling events for a given user within the RAN 14 of the wireless communication network 10 (e.g., channel used, cell used, handover details, etc.). The UE reports 30D may include, for example, information regarding a radio environment experienced by a wireless terminal, such as serving cell signal strength, strength of a surrounding cell, transmit power, etc. The probes 30E correspond to independent machines or servers (not shown) in the wireless communication network 10 that analyze a packet stream, to determine information about throughput. The data sources 30 include behavior data captured, or derived from data captured, on the standardized interfaces discussed above, and/or on other standard interfaces not explicitly labeled in FIG. 1 (e.g., S1, S11, Abis, the air interface between each wireless terminal 12 and its respective RAN 14, etc.). Thus, in one or more embodiments the data describing terminal behavior is obtained from the plurality of network data sources in the form of at least one of network node logs, network node counter output, mobile terminal reports, and probe reports.

Once gathered, the obtained behavior data is grouped by wireless terminal (block 40), using at least one wireless terminal identifier, such as an International Mobile Subscriber Identity (IMSI). For data from the probes 30E, a mapping is performed (block 42) using an IMSI and Temporary Internet Protocol (IP) Address Database (DB) 32, to link recorded data to wireless terminals by associating an IMSI with a temporary Internet Protocol (IP) address of a given wireless terminal. The IMSI mapping correlates the obtained data corresponding to a given subscriber based on their IMSI, and is used to form a single record of the subscriber's activity based on the various pieces of data from the data sources 30. The obtained data is formatted and stored in Measured Records DB 34. This data collection is done by the wireless network operator, without any explicit action being required on behalf of a user of a given wireless terminal.

From database 34, the stored data is processed by a terminal verification unit 42, which includes a plurality of verification modules (VMs) 44A-N that each analyze the stored data in order to distinguish properly working terminals from problematic ones, according to a plurality of performance criteria. Each VM 44 handles one or more of the performance criteria, and analyzes relevant obtained behavior data against those one or more criteria to determine if their criteria have been met. Although the term "performance criteria" is used in relation to the VMs 44 (implying that a plurality of criteria are used by each VM 44), it is understood that a given VM 44 may consider only a single performance criterion (here referred to as "a performance criteria").

If one of the VMs 44 determines that one or more of its criteria have not been met for a given wireless terminal, the VM 44 assigns a severity score to the terminal that is indicative of the extent to which the performance criteria has not been met by the terminal, and that score is stored in the Terminal Score Record DB 36. The database 36 in one or more embodiments includes a matrix for each wireless terminal, together with the main properties of the actual problems experienced by those terminals (e.g., the performance criteria for which they have scores) and the terminal type used. From the database 36, the individual terminal severity scores are grouped by mobile terminal type (block 46).

Aggregated severity scores are then determined for each terminal type (block 48). In one or more embodiments this includes some filtering, such as averaging, or median score determination, to filter out anomalous defective terminals of an otherwise properly functioning terminal type. The aggregated severity scores are stored in Terminal Type Score Records DB 38. Within database 38, score records are grouped by the terminal types to identify the terminal types with the highest score values and/or highest quantity of scores. This identification might give results about a specific investigated area (according to the problem area identified by a single VM) or can be an overall score (combining the results of all the VMs).

From database 38, the aggregated severity scores are processed by a decision unit (block 50). The decision unit 50 compares the aggregated severity scores for each mobile terminal type to corresponding severity score thresholds. If the aggregated score for a given terminal type exceeds its corresponding threshold, the decision unit performs one or more of a plurality of predefined actions based on the extent to which the threshold is exceeded (e.g., warning, terminal blacklisting, etc.). Advantageously, the decision unit 50 may be used to automatically decide what action is needed, based on the magnitude of the aggregated severity score.

Thus, according to some embodiments (e.g., that of FIG. 3 and FIG. 4A), individual severity scores for individual wireless terminals of a given terminal type are determined, and the individual severity scores for the plurality of wireless terminals are aggregated according to terminal type to determine the "aggregated severity score" for the given terminal type." In one embodiment, there is a single aggregated severity score for a given wireless terminal type and it is a sum of all individual severity scores for the terminal type. In another embodiment, there is a plurality of aggregated severity scores for a given terminal type, each corresponding to a sum of individual severity scores for the terminal type for a respective one of the plurality of performance criteria for the terminal type.

FIG. 4B illustrates the method 100 of FIG. 2 according to another embodiment, in which severity scores are not determined for individual wireless terminals, but are instead only determined for terminal types as aggregated severity scores. Thus, in this embodiment, the behavior data is grouped by IMSI (block 40) and is then grouped by terminal type (block 52). The VMs 44 then determine aggregated severity scores for the terminal types, bypassing the individual severity score determinations of FIG. 4A. If one or more performance criteria of a VM 44 are not met, terminal type score records database 38 is updated accordingly, and the severity scores are passed to decision unit 50 as described in FIG. 4A.

Figure 5:
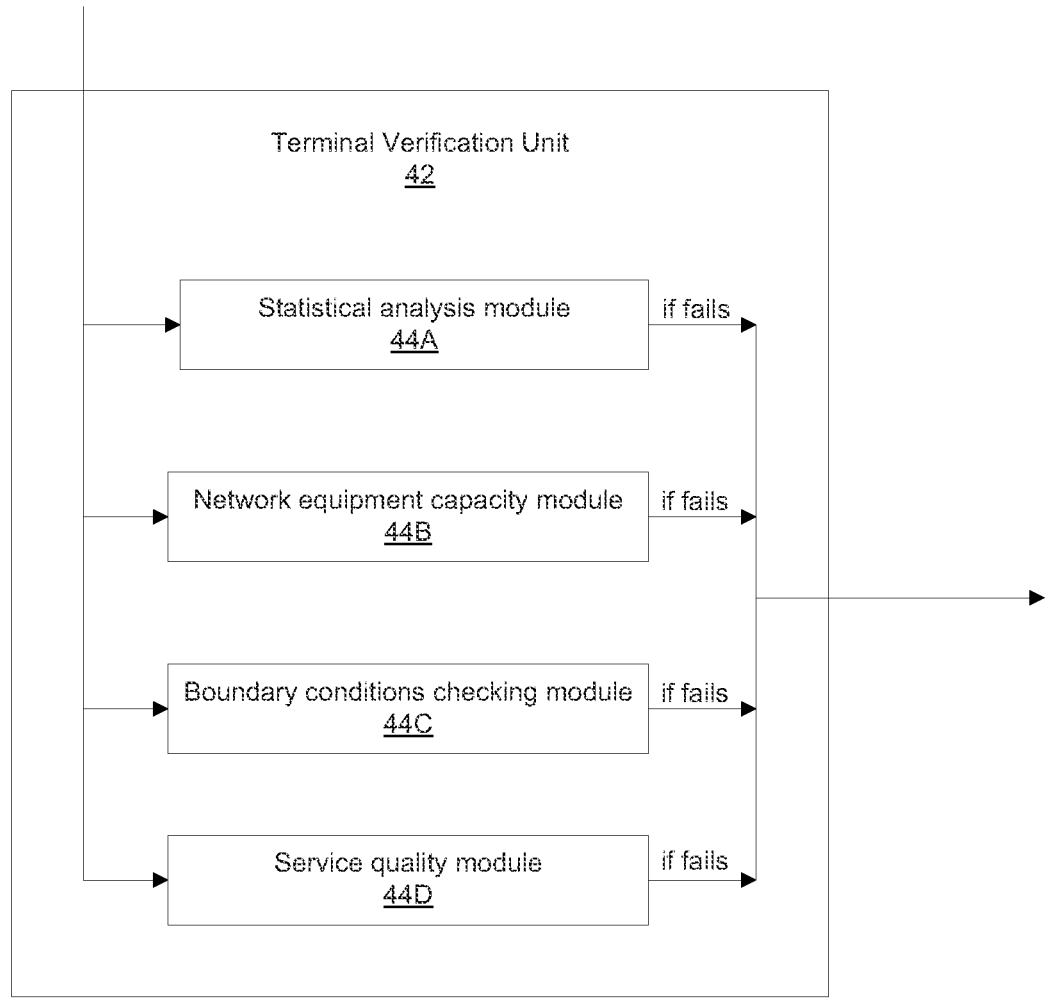
FIG. 5 illustrates an example performance criteria flow diagram.

Some example performance criteria will now be discussed in greater detail. FIG. 5 illustrates an example performance criteria flow diagram for a plurality of VMs 44A-D. Although like reference numerals 44A and 44B are used in each of FIGS. 4A-B and FIG. 5, it is understood that the VMs shown in FIG. 5 are only examples, and that the VMs of FIGS. 4A-B and FIG. 5 may differ. With that in mind, each of the VMs 44A-D of FIG. 5 includes one or more performance criteria that are used to analyze current, and optionally also stored, behavior data for a given terminal type.

Statistical analysis module 44A is configured to identify deviations from typical wireless terminal behavior (i.e., outlier detection). For example, in one or more embodiments the statistical module 44A is operative to compare a high number of different signaling events (e.g., attach, detach, Packet Data Protocol (PDP) activate, etc.) to typical values and/or event quantities for these events, and assign a severity score if the obtained behavior data indicates values in excess of acceptable limits for these signaling events. In one embodiment this includes analyzing occurrences of core network error codes related to signaling failures stemming from a wireless terminal reattaching too fast after detachment, or sending an incorrect field during reattachment. In the same or another embodiment, this includes analyzing whether wireless terminals are overestimating their signal quality to obtain more desirable radio resources. In the same or another embodiment, this includes analyzing how often a mobile terminal "ping pongs" between neighboring cells, which could indicate that the terminal is using a faulty radio module.

Network equipment capacity module 44B is configured to analyze the impact of a given wireless terminal 12 on the wireless communication network 10. In the embodiment of FIG. 4B, for example, this may be done in the aggregate by analyzing the impact of a wireless terminal type (and not just a single terminal) on the wireless communication network 10. In one or more embodiments, the module 44 looks for extraneous small uploads that are transmitted to keep a connection open for a selfish mobile terminal, which benefits the selfish terminal but is detrimental to the network overall. In one or more additional embodiments, the module 44 analyzes whether a number of attach events anomalously increases the signaling load in the wireless communication network 10.

Boundary conditions checking module 44C is configured to identify wireless terminals that exceed permissible boundaries for quantities of signaling events in the wireless communication network, and/or determine terminals whose behavior does not meet the requirements of utilized communication standards in the network 10. In one or more embodiments this includes determining whether a given wireless terminal exceeds a maximum number of allowed PDP activate requests per minute, and/or violates a minimal off time between rejected attach requests. In some embodiments this involves ensuring that a given mobile terminal operates within defined boundaries (e.g., uses a signal strength within a range between X and Y decibels).

Service quality module 44D is configured to analyze the quality of service experienced by a given wireless terminal. In one or more embodiments this includes investigating a relationship between wireless terminal capabilities and a quality of service experienced by the wireless terminal (e.g., if the service quality is badly affected by a large quantity of drops occurring with the given terminal type, the quantity of video freezes is high compared to other terminal types, etc.). In one or more embodiments the service quality module 44D is used to identify terminal types that have poor Service Key Performance Indicator (SKPI) values compared to some desirable or average SKPIs. To do so, SKPIs are calculated for each network activity session of a given wireless terminal, and are stored for the investigated time period (e.g., an observation period). The stored values are used to determine wireless terminal types having high accumulated levels of SKPI values. This information is then forwarded to decision unit 50, which may reject terminal types that do not meet the SKPI requirement of a mobile operator (e.g. number of frame freezes per online video watching session).

Of course, these are only example VMs and it is understood that other VMs could be used in addition to, or instead of, the modules 44A-D. Moreover, while the modules have been described as analyzing single terminals, in one or more embodiments (e.g., the embodiment of FIG. 4B), the modules analyze aggregated data for terminal types and not individual terminals. Thus, module 44C if used in the embodiment of FIG. 4B would identify wireless terminal types that exceed permissible boundaries (instead of individual terminals).

Figure 6:
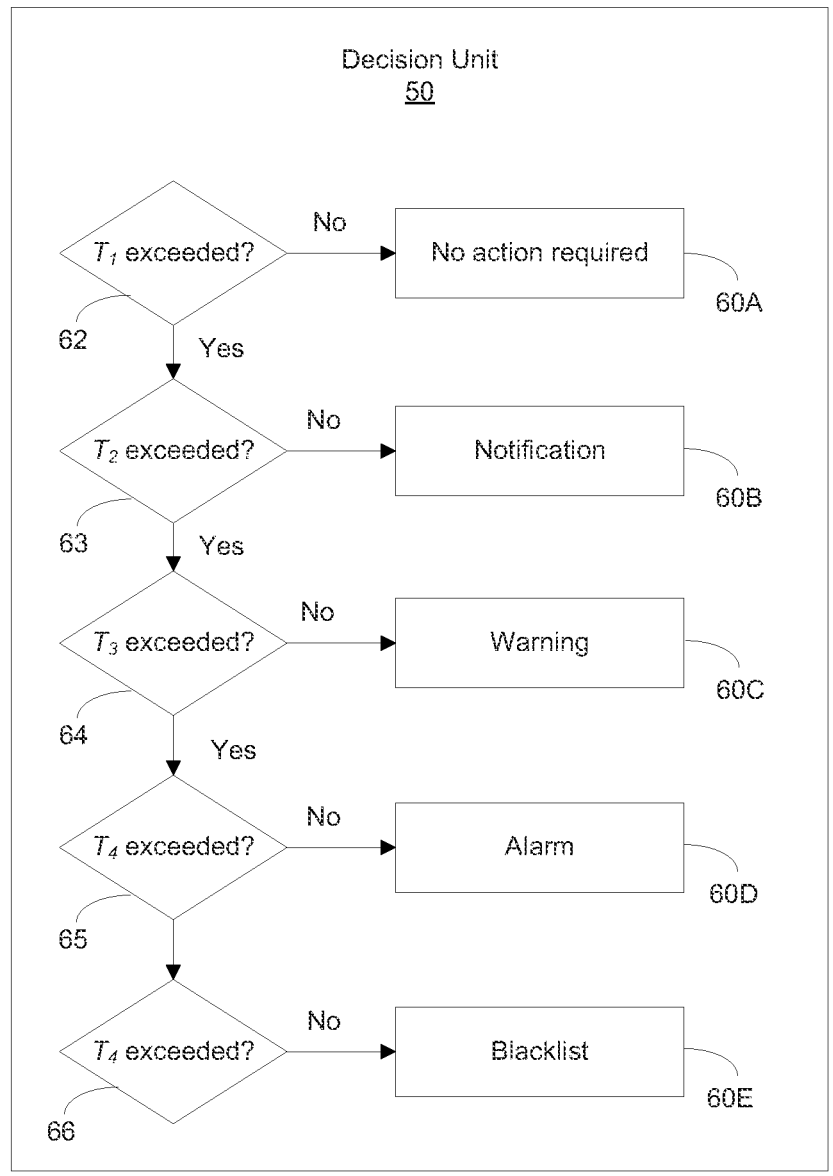
FIG. 6 illustrates an example aggregated severity score analysis.

FIG. 6 illustrates an example aggregated severity score analysis flow diagram implemented by decision unit 50 to determine which of a plurality of predefined actions should be performed, based on the extent to which the severity score threshold is exceeded using a mapping of severity scores to predefined actions. FIG. 6 illustrates a plurality of predefined actions 60A-E, which are arranged in order of increasing intensity, based on a plurality of severity score thresholds $T_1$, $T_2$, $T_3$ and $T_4$. The thresholds are arranged in increasing order such that $T_1 < T_2 < T_3 < T_4$.

If a first severity score threshold ($T_1$) is not exceeded (see block 62), then no action is performed (block 60A), because the decision unit 50 interprets the aggregated severity score for a wireless terminal type as having a small impact on the network capacity and as not endangering network performance.

If $T_1$ is exceeded, but the second severity score threshold ($T_2$) is not exceeded (see block 63), then action 60B is performed. In the example of FIG. 6 this includes providing a notification that the aggregated severity score for the wireless terminal type may be of some concern.

If $T_2$ is exceeded, but the third severity score threshold ($T_3$) is not exceeded (see block 64), then action 60C is performed. In the example of FIG. 6, this includes issuing a warning that the network load is considerably increased, and that network performance may be jeopardized.

If $T_3$ is exceeded, but the fourth severity score threshold ($T_4$) is not exceeded (see block 65), then action 60C is performed. In the example of FIG. 6, this includes providing an alarm indicating that the identified terminal type does not conform with the network standards, or with the actual processes applied by the network operator.

If $T_4$ is exceeded (see block 66), then action 60D is performed. In the example of FIG. 6, this includes an automatic blacklisting of the offending terminal type (i.e., deny access to all the subscribers with this IMEI TAC in the HLR of the network operator), as the terminal type is identified as fundamentally impacting the operation of the network. In one or more embodiments, actions 60C-D also include notifying the subscriber (who is operating an offending mobile terminal) or the customer care center of the network operator if service quality is badly affected by the terminal type. Thus, as shown in FIG. 6, a predefined action 60 may be selected based on a mapping of aggregated severity scores to predefined actions.

A specific embodiment of the method 100 will now be described in greater detail in which signaling parameters are calculated to determine whether a specific wireless terminal overload network nodes 18 or the network 10 with unnecessary signaling events (e.g., attach, activate events, etc.). In one example, this specific embodiment utilizes statistical module 44A and the arrangement of FIG. 4B. In this embodiment, the analyzing network node identifies wireless terminal types that have a relatively large signaling impact while their penetration is low in the network. For this purpose, attach or activate request events initiated by the mobile terminal, are collected.

After having accumulated this information for a certain time period, mobile terminal types that initiate an enormous number of attach or activate requests can be identified, and the network operator can perform the necessary steps to resolve the situation (via decision unit 50). These remedial steps might include firmware upgrades, terminal replacement, or blacklisting the problematic terminal type.

The accumulation of the information can be implemented by a set of matrices, one matrix, denoted by T for each individual terminal. Each element of the matrix is a derived value (D) of the number of individual signaling events during an "accumulation period" time interval (e.g., on the order of an hour or a day). In order to distinguish among the different signaling events, each row of the matrix corresponds to a signaling event type, and is described by an event ID. Each column of the matrix stands for an accumulation period, so that the matrix spans over a longer time "observation period" time interval (e.g., on the order of a week or a month).

The D derived value might be a median value of the number of signaling events during the accumulation period for the terminals of a given type. By this choice one can avoid the effect of some faulty terminals that could bias the result otherwise. The accumulation and the observation periods can be pre-determined or dynamic in accordance with the number or the frequency of the different signaling events.

The calculated T matrices are stored in the Terminal Score Record DB 36. The T matrices are arranged by terminal type (e.g., according to their IMEI/TAC number) to form terminal type matrices M, each of which belongs to a specific terminal type. Each of the M matrices contains data for a single terminal type, and the quantity of M matrices is equal to the number of terminal types in use in the wireless communication network 10 that have severity scores.

The calculated M matrices are stored in the Terminal Type Score Record DB 38. Various F(M) functions can be calculated on the stored M matrices that verify if the necessary conditions are met to approve the usage of the given terminal type in the mobile operator's network. In one embodiment, F(M) is be calculated as a sum of matrix elements:

$$F(M) = \sum_{ij} M_{ij} \quad \text{(equation \#1)}$$

In one or more other embodiments, F(M) is calculated using equations 2-4 shown below, which compare the signaling "cost" relative to the "penetration" of the terminal type, as shown below.

SignalingCost=(number of signaling events of this type)/(total number of signaling events in the network)  (equation #2)

TermPenetration=(number of active terminals of this type)/(total number of active terminals in the network)  (equation #3)

Individual values of F(M) may be calculated using the following equation:

F(M)=SignalingCost/TermPenetration  (equation #4)

In both cases, if F(M) exceeds a certain threshold then the corresponding terminal type is considered as a terminal type that floods the network with signaling messages (i.e., to have a severity score that exceeds the predefined severity score threshold of block 106). Based on the value of F(M), the operator can (via decision unit 50 processing) approve the usage of a given terminal type, or reject the usage of the terminal type, based on the extent to which the severity score threshold is exceeded. In the latter case the network operator may choose to automatically blacklist the terminal type, or launch a deep analysis of the faulty terminal type.

Thus, in this described embodiment, obtaining data describing the behavior of a plurality of wireless terminals in the wireless communication network (block 102 of FIG. 2) includes determining a plurality of types of signaling events occurring for a given terminal type within an observation period, and storing, for each type of signaling event, a value in a terminal type matrix M (see, e.g., FIG. 7) dedicated to the given terminal type, the value being derived from a quantity of signaling events of that type that occurred for the given terminal type within the observation period.

Also, in this embodiment, determining the aggregated severity score for the given terminal type is performed for a performance criteria related to a given type of signaling event, and includes determining a signaling cost (SignalingCost) based on a comparison of the quantity of signaling events of the given type occurring during the observation period, and a total number of signaling events occurring in the network during the observation period (see equation 2 above). The aggregated severity score determination also includes determining a network penetration (TermPenetration) of the terminal type based on a comparison of a quantity of wireless terminals of the terminal type operating in the wireless communication network within the observation period, and a total quantity of wireless terminals of all terminal types operating in the wireless communication network within the observation period (see equation 3 above). The aggregated severity score in this embodiment is then determined as a function of the signaling cost and the network penetration of the terminal type (see equation 4 above).

Figures 7, 8:
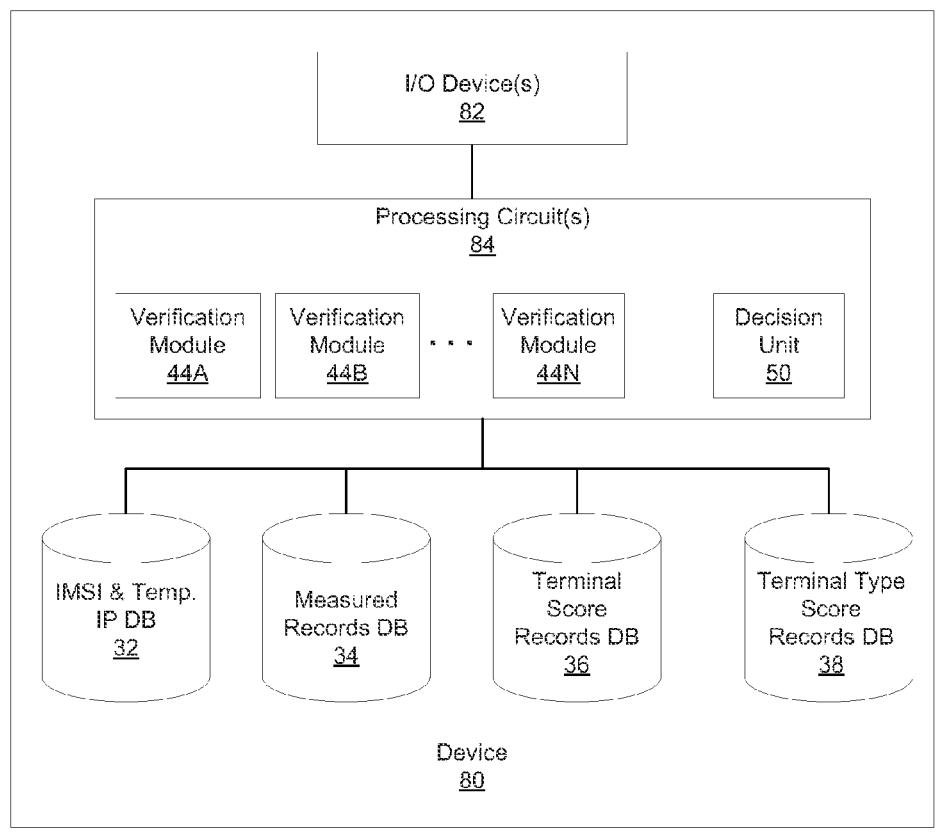
FIG. 7 illustrates an example matrix for a terminal type to track terminal behavior data.
FIG. 8 illustrates an example network node operative to perform the method of FIG. 2.

FIG. 7 illustrates an example matrix 70 for a terminal type that includes a plurality of columns, each corresponding to different accumulation periods, and including a plurality of rows, each of which corresponds to an event type. The accumulation periods collectively form an "observation period." In one example the accumulation periods are shorter periods of time (e.g., on the order of an hour or a day) and the observation periods are longer periods of time (e.g., on the order of a week or a month). Of course, these are only example periods, and it is understood that other periods could be used. In one or more embodiments the event type rows contain aggregated severity scores, and the matrix is stored in the database 38. In the same or another embodiment, each terminal type may have an additional matrix having a similar layout, but where each row stores obtained data describing the behavior of individual mobile terminals (e.g., matrix T described above), before severity scores have been determined.

FIG. 8 illustrates an example device 80 operative to perform the method of FIG. 2 according to one or more embodiments. The device 80 is operatively connected to, or incorporated within, a network node in a wireless communication network (e.g., OSS node 22). Thus, the device 80 may be integrated together with other OSS functionality in a network node. The device 80 includes one or more input/output (I/O) devices 82, one or more processing circuits 84 and memory (see databases 32, 34, 36, 38). In one embodiment the I/O device(s) include a transceiver configured to obtain data describing the behavior of a plurality of wireless terminals 12 in the wireless communication network 10. The one or more processing circuits 84 are used to implement the functionality of the various VMs 44A-44N and decision unit 50. The one or more processing circuits 80 may include, for example, one or more microprocessors, microcontrollers, digital signal processors, Application Specific Integrated Circuits (ASICs) or the like. In one or more embodiments, the VMs 44 and decision unit 50 are implemented in software that is executable by the one or more processing circuits 84. The one or more processing circuits 80 are configured to determine, based on the behavior data, an aggregated severity score for a given terminal type that is indicative of the extent to which one or more of a plurality of performance criteria have not been met by wireless terminals of the given terminal type. The one or more processing circuits 80 are also configured, if the aggregated severity score for the given terminal type exceeds a corresponding severity score threshold, to perform one or more of a plurality of predefined actions based on the extent to which the threshold is exceeded.

The various embodiments discussed above provide a number of advantageous benefits. In one or more embodiments the decision unit 50 is configured to automatically approve and verify (or deny) mobile terminal types based on their signaling and performance data. The data collection is done by the network nodes 18 of the mobile network operator, and in one or more embodiments, based on the collected data, the device 80 automatically scores the observed anomalies and automatically decides on the actions to be done to protect the network 10. The data collection can be performed during voice calls and data connections, seamlessly, without any effect on subscribers.

If the device 80 is configured to continuously record behavior data, and continuously update the M terminal score matrices for each terminal type, the appearance of new untested terminal types in the network 10 is of lesser concern, as the device is able to automatically determine if those devices should be approved for usage in the network. This, in turn, can lessen the administrative burden that would otherwise be placed on network engineers, as the device 80 is able to identify various kinds of terminal type problems (e.g. bogus firmware, low antenna-gain, etc.) that affect the network load or other network related metrics important for the network operator.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method of monitoring wireless terminal behavior in a wireless communication network, each wireless terminal having a defined terminal type, the method being performed by a device operatively connected to, or incorporated within, a network node in the wireless communication network and comprising:
   obtaining data describing the behavior of a plurality of wireless terminals in the wireless communication network;
   based on the obtained data, determining an aggregated severity score for a given terminal type that is indicative of the extent to which one or more of a plurality of performance criteria have not been met by wireless terminals of the given terminal type; and
   if the aggregated severity score for the given terminal type exceeds a corresponding severity score threshold, performing one or more of a plurality of predefined actions based on the extent to which the threshold is exceeded.

2. The method of claim 1, further comprising:
   determining the terminal type of each of the plurality of wireless terminals from a Type Allocation Code (TAC) portion of an International Mobile Station Equipment Identity (IMEI) of each wireless terminal.

3. The method of claim 1, wherein said determining comprises:
   determining individual severity scores for individual wireless terminals of the given terminal type; and
   aggregating the individual severity scores for the plurality of wireless terminals according to terminal type to determine the aggregated severity score for the given terminal type.

4. The method of claim 3, wherein the aggregated severity score for the given terminal type is a sum of all individual severity scores for the terminal type.

5. The method of claim 3, wherein said aggregating the individual severity scores for the plurality of wireless terminals according to terminal type to determine the aggregated severity score for the given terminal type comprises:
   determining a plurality of aggregated severity scores for the given terminal type, each comprising a sum of individual severity scores for the terminal type for a respective one of the plurality of performance criteria.

6. The method of claim 1, wherein said obtaining data describing the behavior of a plurality of wireless terminals in the wireless communication network comprises:
   determining a plurality of types of signaling events occurring for a given terminal type within an observation period; and
   storing, for each type of signaling event, a value in a terminal type matrix dedicated to the given terminal type, the value being derived from a quantity of signaling events of that type that occurred for the given terminal type within the observation period.

7. The method of claim 6, wherein said determining the aggregated severity score for the given terminal type is performed for a performance criteria related to a given type of signaling event, and comprises:
   determining a signaling cost based on a comparison of the quantity of signaling events of the given type occurring during the observation period, and a total number of signaling events occurring in the network during the observation period;
   determining a network penetration of the terminal type based on a comparison of a quantity of wireless terminals of the terminal type operating in the wireless communication network within the observation period, and a total quantity of wireless terminals of all terminal types operating in the wireless communication network within the observation period; and
   determining the aggregated severity score as a function of the signaling cost and the network penetration of the terminal type.

8. The method of claim 1:
   wherein the aggregated severity score for the given terminal type is a performance metric for wireless terminals of the given terminal type for obtained data relating to terminal behavior occurring within an observation period; and
   wherein the severity score threshold is an acceptable level for the performance metric.

9. The method of claim 1, wherein said obtaining data describing the behavior of the plurality of wireless terminals in the wireless communication network comprises:
   obtaining the data from a plurality of network data sources; and
   separately grouping the obtained data for each of the plurality of wireless terminals in the wireless communication network, based on a unique identifier for each wireless terminal, such that obtained data from a plurality of sources may be viewed for a single wireless terminal.

10. The method of claim 1, wherein the data describing terminal behavior is obtained from the plurality of network data sources in the form of at least one of network node logs, network node counter output, mobile terminal reports, and probe reports.

11. The method of claim 1, wherein the performance criteria includes one or more of the following:
   permissible deviations from typical wireless terminal behavior;
   a permissible impact of a given wireless terminal on the wireless communication network;
   permissible boundaries for quantities of signaling events in the wireless communication network; and
   a permissible quality of service level to be experienced by a given wireless terminal.

12. The method of claim 1, wherein said performing one or more of a plurality of predefined actions based on the extent to which the threshold is exceeded comprises:
   selecting a predefined action based on a mapping of aggregated severity scores to predefined actions;
   wherein the plurality of predefined actions include at least one of:
      providing a warning regarding the given terminal type to a network operator of the wireless communication network, to users of wireless terminals of the given terminal type, or both; and
      preventing the given terminal type from utilizing the wireless communication network.

13. A device operatively connected to, or incorporated within, a network node in a wireless communication network, the device being configured to monitor wireless terminal behavior in the wireless communication network, wherein each wireless terminal has a defined terminal type, comprising:
   an input unit configured to obtain data describing the behavior of a plurality of wireless terminals in the wireless communication network; and one or more processing circuits configured to:
  determine, based on the obtained data, an aggregated severity score for a given terminal type that is indicative of the extent to which one or more of a plurality of performance criteria have not been met by wireless terminals of the given terminal type; and
  if the aggregated severity score for the given terminal type exceeds a corresponding severity score threshold, perform one or more of a plurality of predefined actions based on the extent to which the threshold is exceeded.

14. The device of claim 13, wherein the one or more processing circuits are further configured to:
  determine the terminal type of each of the plurality of wireless terminals from a Type Allocation Code (TAC) portion of an International Mobile Station Equipment Identity (IMEI) of each wireless terminal.

15. The device of claim 13, wherein the one or more processing circuits are configured to determine the aggregated severity score by:
  determining individual severity scores for individual wireless terminals of the given terminal type; and
  aggregating the individual severity scores for the plurality of wireless terminals according to terminal type to determine the aggregated severity score for the given terminal type.

16. The device of claim 15, wherein the aggregated severity score for the given terminal type is a sum of all individual severity scores for the terminal type.

17. The device of claim 13, wherein the one or more processing circuits are configured to aggregate the individual severity scores for the plurality of wireless terminals according to terminal type to determine the aggregated severity score for the given terminal type by:
  determining a plurality of aggregated severity scores for the given terminal type, each comprising a sum of individual severity scores for the terminal type for a respective one of the plurality of performance criteria.

18. The device of claim 13, wherein the one or more processing circuits are configured to obtain data describing the behavior of a plurality of wireless terminals in the wireless communication network by:
  determining a plurality of types of signaling events occurring for a given terminal type within an observation period; and
  storing, for each type of signaling event, a value in a terminal type matrix dedicated to the given terminal type, the value being derived from a quantity of signaling events of that type that occurred for the given terminal type within the observation period.

19. The device of claim 18, wherein the one or more processing circuits are configured to determine the aggregated severity score for the given terminal type for a performance criteria related to a given type of signaling event, and are configured to perform the determining by:
  determining a signaling cost based on a comparison of the quantity of signaling events of the given type occurring during the observation period, and a total number of signaling events occurring in the network during the observation period;
  determining a network penetration of the terminal type based on a comparison of a quantity of wireless terminals of the terminal type operating in the wireless communication network within the observation period, and a total quantity of wireless terminals of all terminal types operating in the wireless communication network within the observation period; and
  determining the aggregated severity score as a function of the signaling cost and the network penetration of the terminal type.

20. The device of claim 13:
  wherein the aggregated severity score for the given terminal type is a performance metric for wireless terminals of the given terminal type for obtained data relating to terminal behavior occurring within an observation period; and
  wherein the severity score threshold is an acceptable level for the performance metric.

21. The device of claim 13, wherein the one or more processing circuits are configured to obtain data describing the behavior of the plurality of wireless terminals in the wireless communication network by:
  obtaining the data from a plurality of network data sources; and
  separately grouping the obtained data for each of the plurality of wireless terminals in the wireless communication network, based on a unique identifier for each wireless terminal, such that obtained data from a plurality of sources may be viewed for a single wireless terminal.

22. The device of claim 13, wherein the data describing terminal behavior is obtained from the plurality of network data sources in the form of at least one of network node logs, network node counter output, mobile terminal reports, and probe reports.

23. The device of claim 13, wherein the one or more processing circuits comprise a plurality of verification modules, each configured to analyze the obtained data against one or more of the performance criteria, the verification modules including one or more of the following:
  a statistical module configured to identify deviations from typical wireless terminal behavior;
  a network equipment capacity module configured to analyze the impact of a given wireless terminal on the wireless communication network;
  a boundary condition checking module configured to identify wireless terminals that exceed permissible boundaries for quantities of signaling events in the wireless communication network; and
  a service quality module configured to analyze the quality of service experienced by a given wireless terminal.

24. The device claim 13:
  wherein the one or more processing circuits are configured to perform one or more of a plurality of predefined actions based on the extent to which the threshold is exceeded based on a mapping of aggregated severity scores to predefined actions; and
  wherein the plurality of predefined actions include at least one of:
    providing a warning regarding the given terminal type to a network operator of the wireless communication network, to users of wireless terminals of the given terminal type, or both; and
    preventing the given terminal type from utilizing the wireless communication network.

* * * * *

UNITED STATES PATENT AND TRADEMARK OFFICE
CERTIFICATE OF CORRECTION

PATENT NO. : 8,838,093 B2  
APPLICATION NO. : 13/749815  
DATED : September 16, 2014  
INVENTOR(S) : Hága et al.

Page 1 of 1

It is certified that error appears in the above-identified patent and that said Letters Patent is hereby corrected as shown below:

In the Specification

In Column 7, Line 63, delete "60C" and insert -- 60D --, therefor.

In Column 8, Line 1, delete "60D" and insert -- 60E --, therefor.

In Column 10, Line 26, delete "circuits 80" and insert -- circuits 84 --, therefor.

In Column 10, Line 32, delete "circuits 80" and insert -- circuits 84 --, therefor.

In Column 10, Line 37, delete "circuits 80" and insert -- circuits 84 --, therefor.

In the Claims

In Column 14, Line 49, in Claim 24, delete "device" and insert -- device of --, therefor.

Signed and Sealed this  
Seventeenth Day of November, 2015

Michelle K. Lee  
*Director of the United States Patent and Trademark Office*